US010731317B2

(12) United States Patent
Heilman et al.

(10) Patent No.: US 10,731,317 B2
(45) Date of Patent: Aug. 4, 2020

(54) ADJUSTABLE COUPLING MECHANISM FOR A FILTER ASSEMBLY FOR A RETAINING WALL DRAINAGE TUBE

(71) Applicant: Jet Filter Systems, LLC, Casey, IL (US)

(72) Inventors: David R. Heilman, Fenville, MI (US); Doug Stoutin, Casey, IL (US); David Gentry, Casey, IL (US); Anthony King, Olney, IL (US); Kyle C. Edmondson, Evansville, IN (US)

(73) Assignee: Jet Filter Systems, LLC, Casey, IL (US)

( * ) Notice: Subject to any disclaimer, the term of this patent is extended or adjusted under 35 U.S.C. 154(b) by 0 days.

(21) Appl. No.: 16/241,120

(22) Filed: Jan. 7, 2019

(65) Prior Publication Data
US 2019/0211525 A1    Jul. 11, 2019

Related U.S. Application Data

(60) Provisional application No. 62/615,169, filed on Jan. 9, 2018.

(51) Int. Cl.
| E02D 31/10 | (2006.01) |
| B01D 35/02 | (2006.01) |
| B01D 29/23 | (2006.01) |
| B01D 35/30 | (2006.01) |
| E02D 29/02 | (2006.01) |

(52) U.S. Cl.
CPC ............. *E02D 31/10* (2013.01); *B01D 29/23* (2013.01); *B01D 35/02* (2013.01); *B01D 35/30* (2013.01); *B01D 2201/0415* (2013.01); *B01D 2201/291* (2013.01); *B01D 2201/30* (2013.01); *E02D 29/02* (2013.01)

(58) Field of Classification Search
CPC ......... E02D 31/10; E02D 29/02; B01D 35/30; B01D 29/23; B01D 35/02; B01D 2201/0415; B01D 2201/291; B01D 2201/30
USPC ............... 210/232, 435, 439, 446, 447, 282, 210/170.01, 171.02, 170.03, 170.07, 210/170.08, 170.09, 450
See application file for complete search history.

(56) References Cited

U.S. PATENT DOCUMENTS 8,715,495 B1 * 5/2014 Smith .................. E04D 13/0767
                                                              210/162
8,741,132 B2 * 6/2014 Graf ........................ E04D 13/08
                                                              210/170.03

* cited by examiner

Primary Examiner — Madeline Gonzalez
(74) Attorney, Agent, or Firm — Harness, Dickey & Pierce, P.L.C.

(57) ABSTRACT

A filter assembly for relieving hydrostatic pressure includes a housing with a flange and a shell. The flange includes an opening extending through the flange and the shell includes a base and a terminating end. The base of the shell is connected to the flange at the opening and extends away from the flange toward the terminating end. The filter assembly also includes a coupling mechanism with a drain pipe orifice to accept a drain pipe therein. The coupling mechanism is movably connected to the terminating end of the shell such that the coupling mechanism can move relative to the shell to change a position of the drain pipe orifice relative to the terminating end of the shell. The filter assembly also includes a filter cartridge removably positioned inside the shell and a face plate removably connected to the flange to secure the filter cartridge inside the shell.

20 Claims, 12 Drawing Sheets

ADJUSTABLE COUPLING MECHANISM FOR A FILTER ASSEMBLY FOR A RETAINING WALL DRAINAGE TUBE

RELATED APPLICATIONS

This application claims the benefit of and priority to U.S. Patent Application No. 62/615,169 filed on Jan. 9, 2018. The entire disclosure of the above application is incorporated herein by reference.

FIELD

The present disclosure relates to filter assemblies that include adjustable coupling mechanisms for connection to a retaining wall drain tube.

BACKGROUND

This section provides background information related to the present disclosure and is not necessarily prior art.

Retaining walls and seawalls are commonly built between adjacent land formations and/or a land formation and a body of water to prevent the erosion or the movement of soil, sand, gravel or other ground material. Such retaining walls maintain an aesthetically pleasing appearance and limit the amount of maintenance required to replace or repair ground material that can move due to the flow of water. Retaining walls are generally vertical rigid structures that retain the soil, sand, gravel or other ground material that is located on one side of the retaining wall from being washed or otherwise eroded away by the water that flows, collects or otherwise moves through the ground material. The term retaining wall as used herein includes various walls and other structures used to prevent the erosion or movement of ground materials as a result of water pressure, water flow or other cause of ground movement. These various retaining walls include seawalls, bridge abutments, bulkheads, spillways and other erosion control barriers. Retaining walls can be composed of materials such as concrete, steel sheet pile, vinyl sheet pile, wood and other materials.

Rain, waves, tidal changes, groundwater flow or other sources of water can be deposited on the ground material on one side of the retaining wall over time. The accumulation of water on one side of the retaining wall creates hydrostatic water pressure against the back side of the retaining wall. Unless the hydrostatic water pressure is relieved, the retaining wall can be damaged or otherwise fail.

One way of relieving the hydrostatic water pressure that may exist on the retaining wall is to add drain holes (also known as weep holes) through the retaining wall. While the drain holes can be effective for relieving the hydrostatic water pressure, the drain holes have disadvantages. First, the drain holes can become clogged which prevents the drain holes from relieving the hydrostatic water pressure. Second, the drain holes can permit soil or other ground material to pass through the drain hole. The loss of ground material through the drain hole can cause sinkholes or other problems to develop. Filter assemblies can be inserted into the drain holes to permit water to pass through the drain hole while preventing ground material from being displaced.

Another way of limiting the hydrostatic water pressure that can build on one side of a retaining wall is to bury, bore, insert or otherwise include drain tubes or drain pipes in the ground material. Such drain tubes can extend away from the retaining walls and through the ground material. The drain tubes can be perforated or otherwise connected to water collectors in order to collect water that is deposited in or on the ground material and to move the collected water toward the retaining wall and through the retaining wall through the drain holes. It can be difficult to align the drain tubes relative to the retaining wall and relative to the drain holes. Such alignment problems can result in difficulties in connecting filter assemblies to both the retaining wall and to the drain tube to allow hydrostatic water pressure to be relieved from both the ground material adjacent to the filter assembly and from the water collected by the drain tube.

Repairing failed drain holes, repairing failed drain tubes or repairing land formations that are supported by retaining walls requires costly excavation that takes considerable time and effort to complete. There exists a need, therefore, for improved filter assemblies that address the foregoing issues while still providing hydrostatic water pressure relief and erosion control.

SUMMARY

This section provides a general summary of the disclosure, and is not a comprehensive disclosure of its full scope or all of its features.

In some examples of the present disclosure, a filter assembly for relieving hydrostatic pressure can include a housing with a flange and a shell. The flange can include an opening extending through the flange and the shell can include a base and a terminating end. The base of the shell can be connected to the flange at the opening and extend away from the flange toward the terminating end of the shell. The filter assembly can also include a coupling mechanism with a drain pipe orifice to accept a drain pipe therein. The coupling mechanism can be movably connected to the terminating end of the shell such that the coupling mechanism can move relative to the shell to change a position of the drain pipe orifice relative to the terminating end of the shell. The filter assembly can also include a filter cartridge removably positioned inside the shell and a face plate removably connected to the flange to secure the filter cartridge inside the shell.

In another aspect, the drain pipe orifice of the coupling mechanism is movable in an adjustment plane to change the position of the drain pipe orifice relative to the terminating end of the shell, the adjustment plane disposed substantially parallel to the flange.

In another aspect, the coupling mechanism can include a first retention tab and a second retention tab that each project away from the coupling mechanism and engage the shell to retain the coupling mechanism to the shell.

In yet another aspect, the filter cartridge can include a drip member spaced apart from the flange in which a back surface of the drip member is angled away from the flange to prevent groundwater from wicking toward the flange.

In another aspect, the filter cartridge can include a guide ramp that has an angled surface for guiding groundwater that exits the drain tube toward the drip member.

In another aspect, at least a portion of the face plate can wrap around an outer edge of the filter cartridge and contact the housing.

In yet another aspect, the face plate can include an extension that extends across the drip member and is spaced apart therefrom to allow water to exit the filter cartridge between the drip member and the face plate.

Other advantages and objects of the present disclosure will become apparent to those skilled in the art from the subsequent detailed description, appended claims and drawings. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
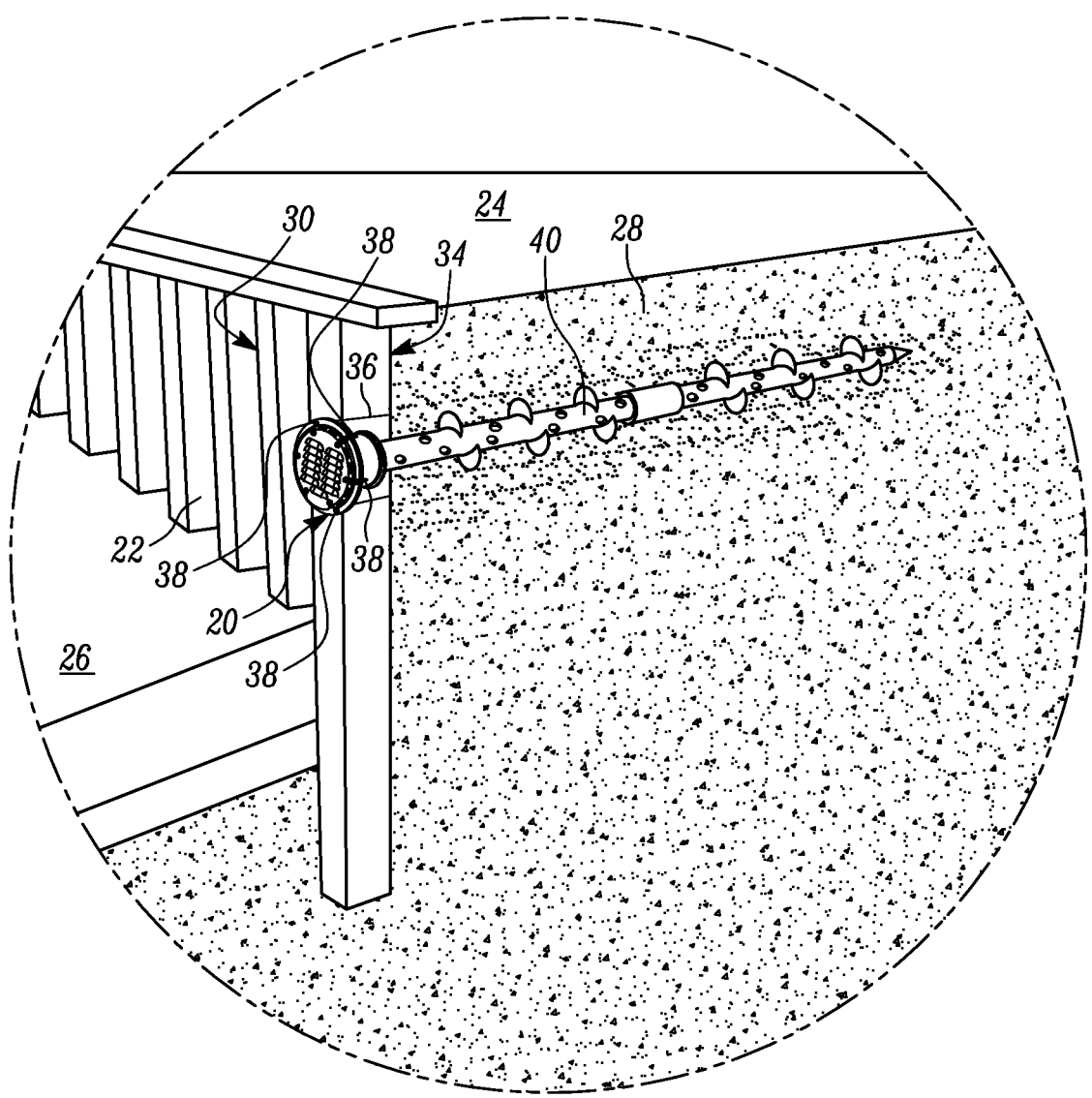
FIG. 1 is an illustration of an example filter assembly of the present disclosure installed in a retaining wall and connected to a drain pipe.
Figure 2:
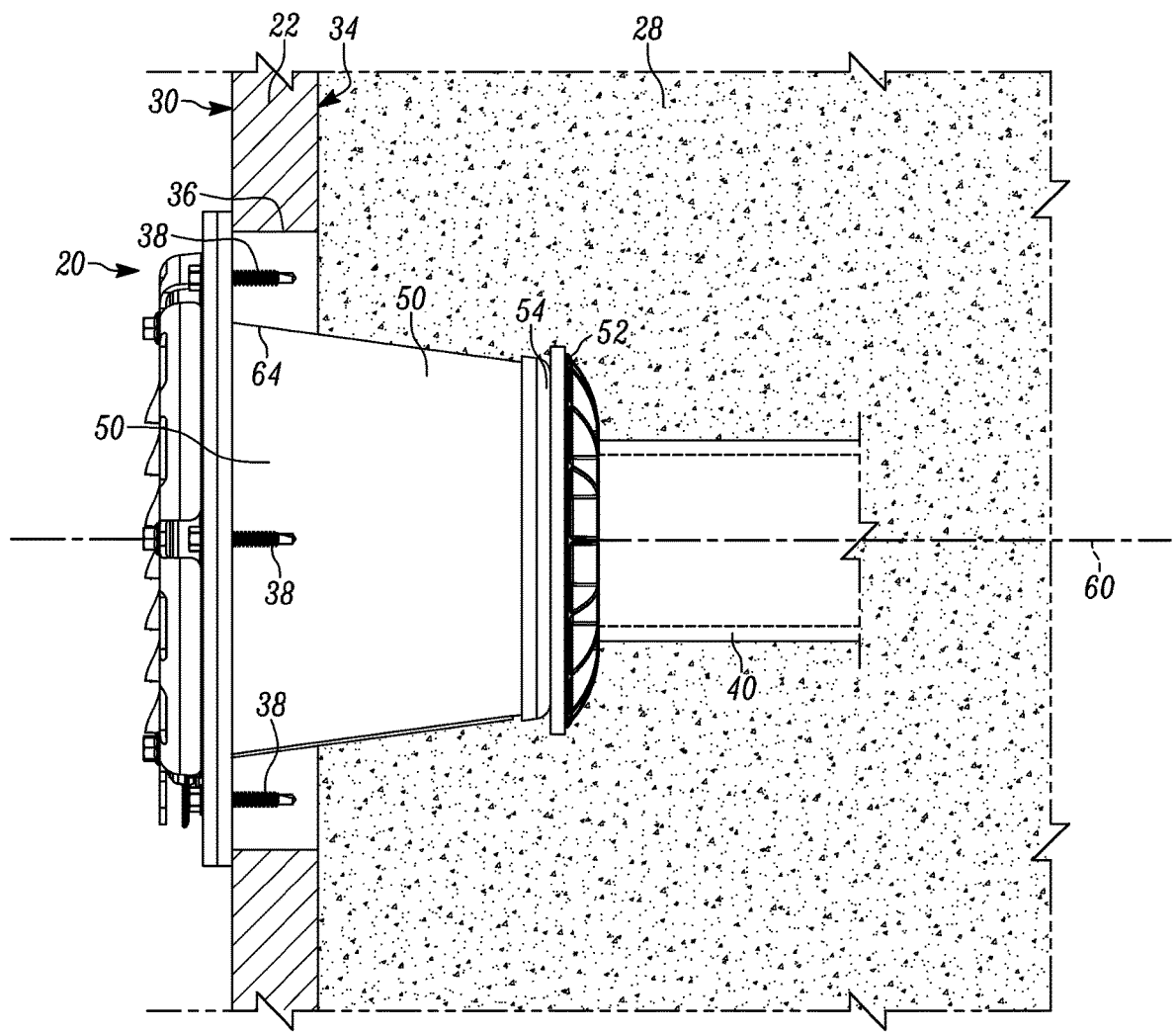
FIG. 2 is a side view of an example filter assembly of the present disclosure shown in an installed position in a drain hole in a retaining wall and connected to a drain pipe wherein the drain pipe is aligned with the drain hole.

As shown in FIGS. 1 and 2, an example filter assembly 20 can be installed in a retaining wall 22. In the example shown, the retaining wall 22 separates a first area 24 of ground material 28 that is elevated above a second area 26. As can be appreciated, the ground material 28 in the first area 24 would be susceptible to erosion or movement if the retaining wall 22 were not positioned vertically against the ground material 28. The retaining wall 22 includes a first side 30 disposed adjacent the first area 24 and a second side 34 disposed adjacent the second area 26. The retaining wall 22 can include one or more drain holes 36 that extend through the retaining wall 22 from the first side 30 to the second side 34. The filter assembly 20 can be positioned in the drain hole 36 and, as will be further described, secured in position to retaining wall 22 using any suitable attachments, such as one or more fasteners 38.

In the example shown, the filter assembly 20 is also fluidly connected to a drain pipe 40. This connection permits the groundwater that moves into or is collected by the drain pipe 40 to flow from the drain pipe 40 through the filter assembly 20 and out the drain hole 36. This movement of the groundwater through the drain pipe 40 as well as movement of groundwater through the filter assembly 20 from the ground material 28 adjacent to the filter assembly 20 can relieve the hydrostatic water pressure that can accumulate behind the first side 30 of the retaining wall 22.

The drain pipe 40 is located below the surface of the ground material 28 in the first area 24. The drain pipe 40 can be any suitable drain tubing that can collect or allow water to move into the drain pipe 40. In the example shown, the drain pipe 40 is configured as an auger-type drain pipe 40 that can be mechanically driven into the ground material 28. One example of such a drain pipe 40 is described in U.S. Pat. No. 9,366,084 issued on Jun. 14, 2016, titled DIRECT TORQUE HELICAL DISPLACEMENT WELL AND HYDROSTATIC LIQUID PRESSURE RELIEF DEVICE, the content of which is hereby incorporated by reference. In other examples, other drain pipes, tubing, or the like can be used.

The drain pipe 40 can be aligned with the drain hole 36 such that the filter assembly 20 can be inserted into the drain hole 36 and also fluidly connected to the drain pipe 40. The filter assembly 20 includes, as will be further detailed below, a housing 50 and a coupling mechanism 52. The coupling mechanism 52 is movably connected at a terminating end 54 of the housing 50. The coupling mechanism 52 can fluidly connect the drain pipe 40 to the filter assembly 20 such that substantially all of the groundwater collected inside the drain pipe 40 flows from the drain pipe 40 and into the filter assembly 20 without significant leakage between the coupling mechanism 52 and the housing 50.

The coupling mechanism 52 can move relative to the housing 50 to allow for misalignment between the drain pipe 40 and the drain hole 36. As shown in FIG. 2, the drain hole 36 and the drain pipe 40 are aligned such that the center of the drain hole 36 is aligned with the center of the drain pipe 40 along a first axis 60. When such alignment exists, the filter assembly 20 can be easily installed into the drain hole 36 and onto the drain pipe 40.

Figure 3:
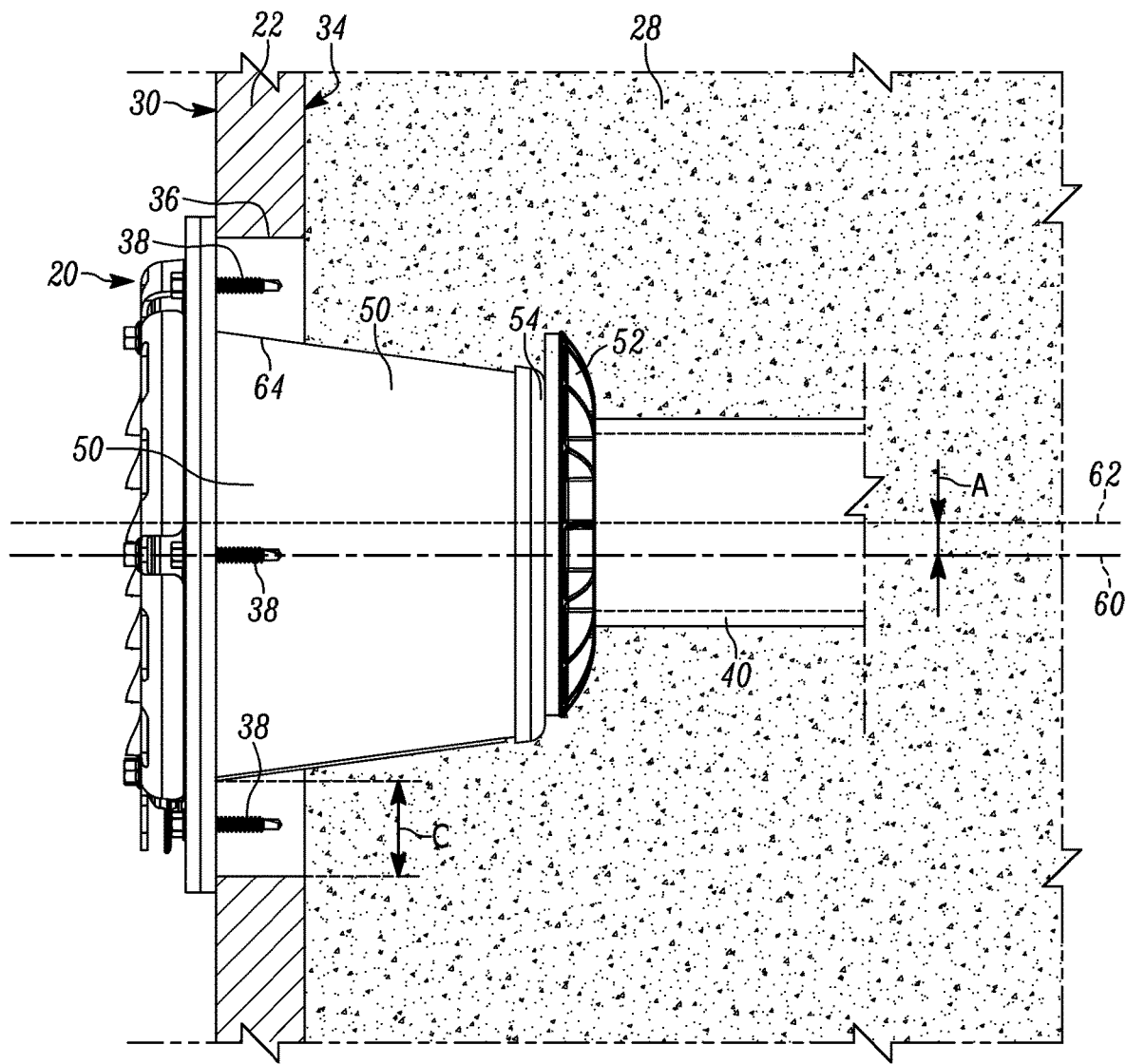
FIG. 3 is the side view of FIG. 2 showing the filter assembly connected to a drain pipe that is offset from the drain hole.
Figure 4:
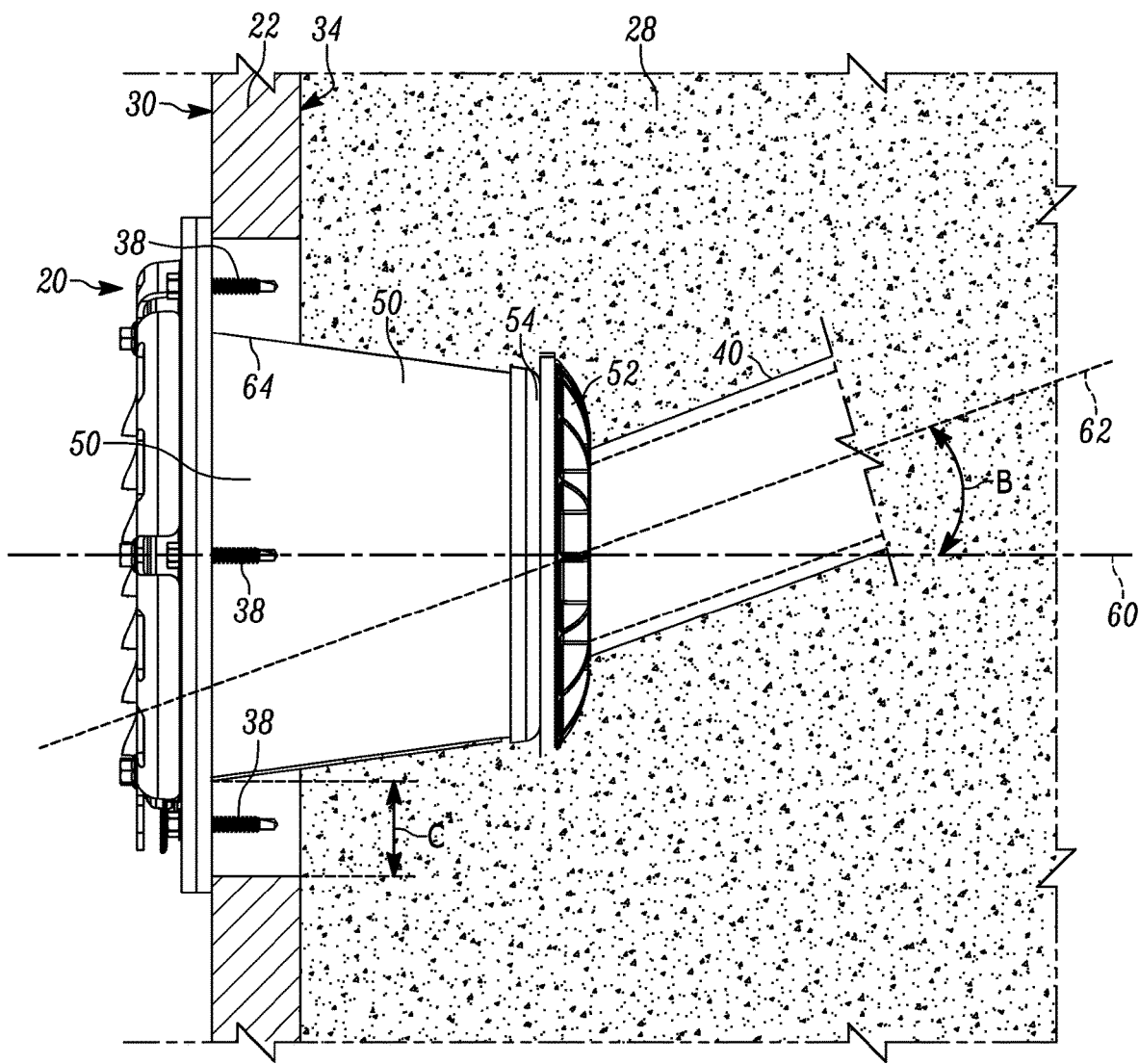
FIG. 4 is the side view of FIG. 2 showing the filter assembly connected to a drain pipe that is misaligned at a skewed angle from the drain hole.

During the construction or installation of the retaining wall 22, the drain hole 36 and/or the drain pipe 40, misalignment can occur. The ground material 28 can shift, for example, or the drain pipe 40 may be difficult to install in an aligned orientation. This can be particularly troublesome in circumstances in which the drain pipe 40 may extend any length into the ground material 28 from the first side 30 of the retaining wall 22. FIGS. 3 and 4 show two examples of misalignments that can occur between the drain hole 36 and the drain pipe 40. In one example (FIG. 3), the drain pipe 40 can be positioned such that the first axis 60 is offset from a second axis 62. The first axis 60 is defined orthogonally to the second side 34 of the retaining wall 22 at the center of the drain hole 36. The second axis 62 is defined by a center axis of the drain pipe 40. As can be seen, the first axis 60 is offset by a distance A from the second axis 62. In the example shown, the second axis 62 is offset above the first axis 60 by the distance A. In other examples, circumstances of the relative positioning of the drain pipe 40 to the drain hole 36 can result in the drain pipe 40 having other positioning relative to the drain hole 36 such as being positioned below, to the left of or to the right of the drain hole 36. In still other circumstances, the drain pipe 40 can be positioned relative to the drain hole 36 in some combination of the foregoing described offsets.

In still other example installations, the drain pipe 40 can be misaligned and/or offset from the drain hole 36 such that the second axis 62 is positioned at an oblique angle B relative to the first axis 60. As shown in FIG. 4, such misalignment can result in the drain pipe 40 being skewed relative to the retaining wall 22 and/or relative to the filter assembly 20.

As further described below, the filter assemblies 20 of the present disclosure include a movable coupling mechanism 52 that can move relative to the housing 50. Such movement of the coupling mechanism 52 permits the filter assembly 20 to accept drain pipes 40 that are oriented in the manners previously described and accommodate such misalignments. To further permit variation between the positioning of the drain pipe 40 and the drain hole 36, the housing 50 can have an outer diameter at a base 64 that is undersized relative to the inner diameter of the drain hole 36. Such difference between the outer diameter of the base 64 of the housing 50 and the inner diameter of the drain hole 36 creates a gap C as shown in FIGS. 3 and 4. The gap C allows the housing 50 of the filter assembly 20 to move inside the drain hole 36 during installation. This gap C can further allow the filter assembly 20 to accommodate misalignment between the drain pipe 40 and the drain hole 36.

Figure 5:
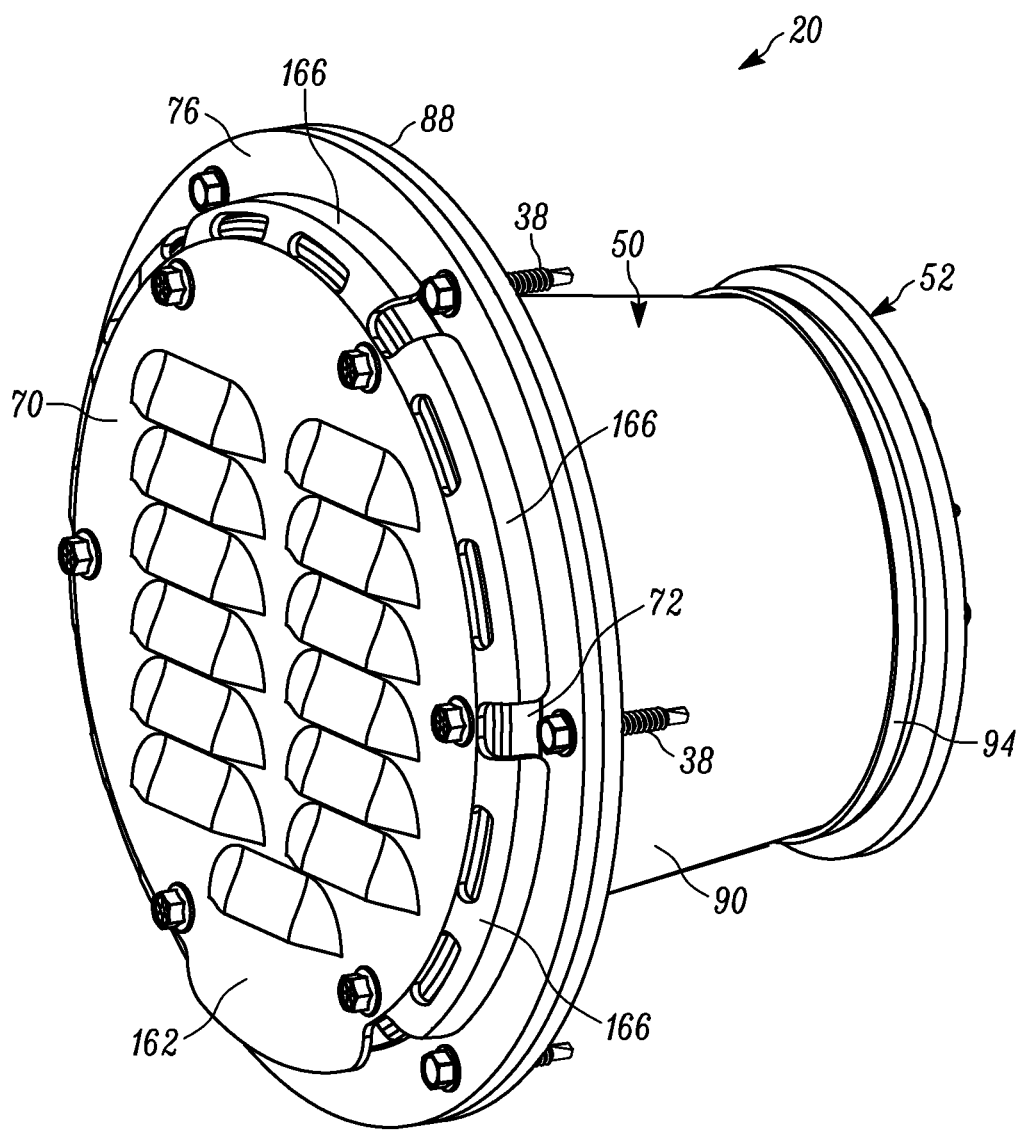
FIG. 5 is an isometric front view of the filter assembly of FIG. 3.
Figure 6:
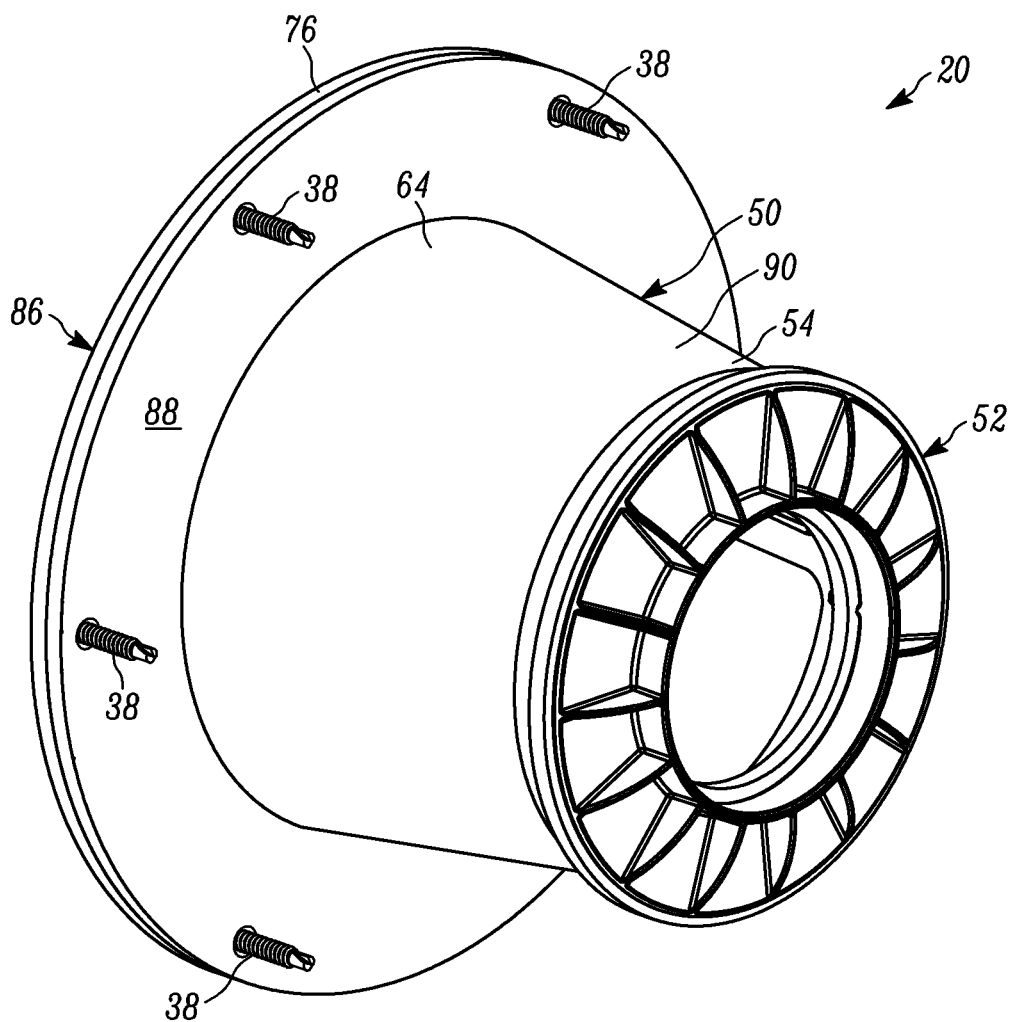
FIG. 6 is an isometric back view of the filter assembly of FIG. 3.
Figure 7:
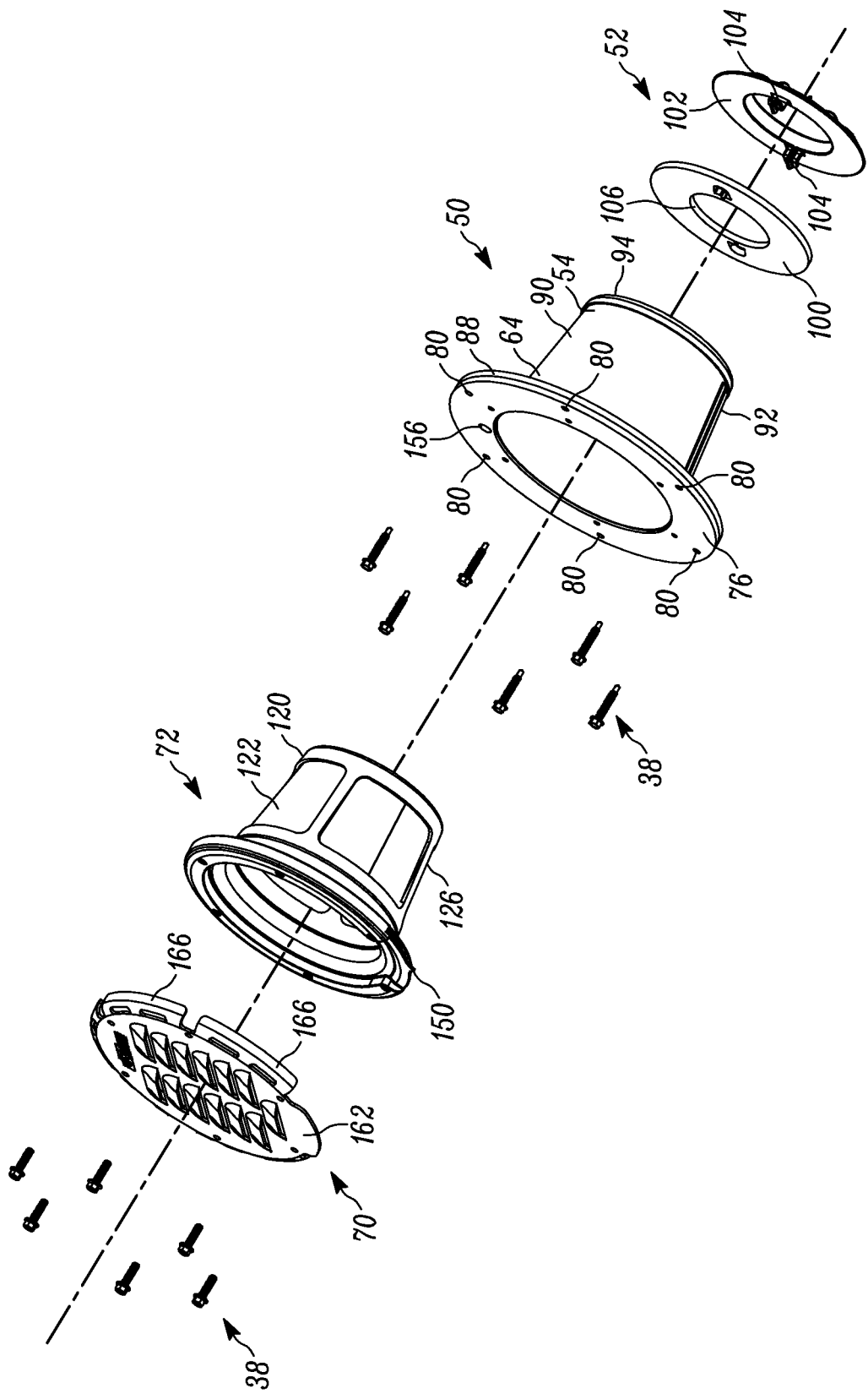
FIG. 7 is an exploded view of the filter assembly of FIG. 3.

Referring now to FIGS. 5-7, the example filter assembly 20 is shown. The filter assembly 20 can include the housing 50, the coupling mechanism 52, a face plate 70, and a filter cartridge 72. Some aspects of the filter assembly 20 may be similar or have similar features and/or construction as the filter assemblies described in U.S. patent application Ser. No. 15/662,433 filed on Jul. 28, 2017 titled FILTER ASSEMBLY FOR RETAINING WALL DRAIN HOLES, the content of which is hereby incorporated by reference. The filter assembly 20 of the present disclosure, however, can not only prevent erosion and relieve hydrostatic water pressure from ground water that accumulates adjacent to the retaining wall 22 but the filter assembly 20 can also fluidly connect to the drain pipe 40 and self-align with the drain pipe 40 when misalignments may occur between the drain pipe 40 and the drain hole 36.

As shown in FIGS. 5-9, the housing 50 of the filter assembly 20 is the main body portion of the filter assembly 20. The housing 50 can include a flange 76 and a shell 78. The flange 76 is a planar member that is positioned adjacent to the retaining wall 22 when the filter assembly 20 is installed. As such, the flange 76 has an outer profile that is larger than the drain hole 36. In the example shown, the flange 76 is circular in shape. In other examples, the flange 76 can have other profiles or shapes. The flange 76 can include one or more wall attachment points 80 that can accept fasteners. The flange 76 can connect the housing 50 in a desired position in the drain hole 36 by inserting fasteners 38 through the wall attachment points 80 and into the retaining wall 22. The flange 76 can also include one or more face plate attachment points 82. The face plate attachment points 82 can accept fasteners in order to connect the face plate 70 and/or the filter cartridge 72 to the housing 50. As shown, the face plate attachment points 82 can be positioned radially inward of the wall attachment points 80 so that the face plate 70 and/or the filter cartridge 72 can be removed while the housing 50 remains secured to the retaining wall 22.

In other examples, the housing 50 can include other types or configuration of wall attachment points 80 and/or face plate attachment points 82. For example, the face plate attachment points 82 can be configured to accept clips, hooks or other attachment features that can be molded into or integrally formed with the filter cartridge 72 and/or the face plate 70.

The flange 76 includes a wall-facing side 84 and an exposed side 86. The wall-facing side 84 of the flange 76 is positioned toward the retaining wall 22 when the filter assembly 20 is seated in an installed position. A wall gasket 88 can be seated against the wall-facing side of the flange 76. The wall gasket 88 can be made of any suitable foam or other elastomeric material. The wall gasket 88 can be secured to the wall-facing side of the flange 76 with adhesive or with any other suitable attachment. The wall gasket 88 is positioned between the flange 76 and the retaining wall 22 to seal the housing 50 to the retaining wall 22 when the filter assembly 20 is installed.

The housing 50 can also include a shell 90 that extends away from the flange 76. The shell 90 is attached to the flange 76 at the base 64 and projects outward therefrom to the terminating end 54. In the example shown, the shell 90 can have a frusto-conical shape. In other examples, the shell 90 can have other shapes.

In the example shown, the shell 90 is made of a perforated material such as a sheet of stainless steel perforated with holes. The sheet of perforated material can be rolled or otherwise formed into the frusto-conical shape and held in position using a retention strip 92 or other suitable connector member. The shell 90 can also include a cap 94 that can be secured at the terminating end 54 of the shell 90. The cap 94 can be molded or formed out of any suitable material such as stainless steel or other suitable metal, plastic or composite material.

Figure 9:
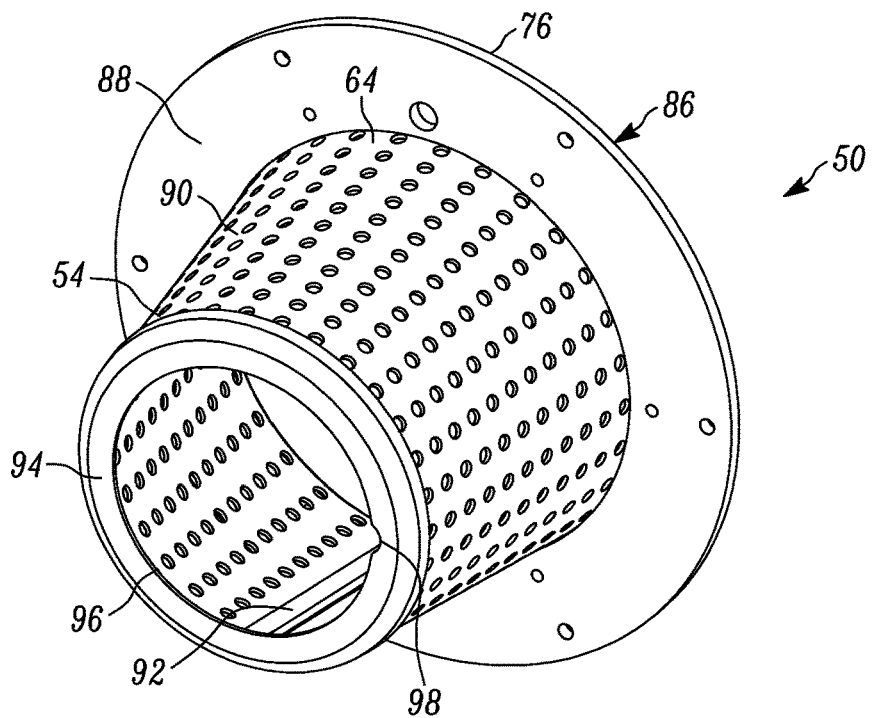
FIG. 9 is an isometric back view of the housing of the filter assembly of FIG. 5.

The cap 94, as shown in FIG. 9, can include a drain pipe opening 96. The drain pipe opening 96 is sized to accept the drain pipe 40 when the filter assembly 20 is installed in the drain hole 36 and over the drain pipe 40. The drain pipe opening 96 can include a scallop 98. The scallop 98 is a portion of the edge of the drain pipe opening 96 that is removed. The scallop 98 is sized so that, as will be further described, the coupling mechanism 52 can be connected to the housing 50 prior to installation of the filter assembly 20 in the drain hole 36. In the example shown, the scallop 98 has an arcuate shape. In other examples, the scallop can have other shapes or configurations.

Figure 8:
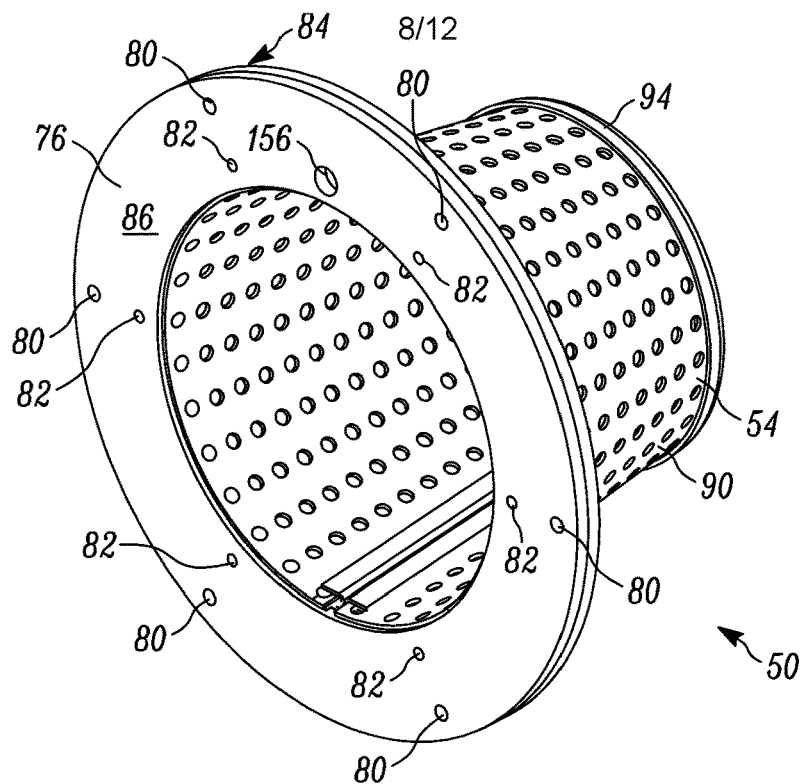
FIG. 8 is an isometric front view of the housing of the filter assembly of FIG. 5.

As shown in the example of FIGS. 8 and 9, the entire outer surface of the shell 90 can be perforated. As such, groundwater can enter the shell 90 from any position in the ground material 28 that is adjacent to the shell 90. In other examples, the shell 90 may have one or more perforated portions that are locally positioned at a desired position on the shell 90. For example, the shell 90 can include a perforated portion that is positioned on a top of the shell 90 such that groundwater can enter the shell 90 as the groundwater moves downward due to gravity through the ground material 28. In such examples, the bottom portion of the shell 90 can be solid and/or water impermeable. Such solid or non-perforated portions of the shell 90 can be desirable to ensure that groundwater that moves into the shell 90 at the top perforated portion (or from the drain pipe 40) does not flow or otherwise exit the shell 90 after the groundwater enters the shell 90. In still other examples, half (or 90 degrees circumferentially) of the shell 90 is perforated and the other half is solid or non-perforated.

Figure 10:
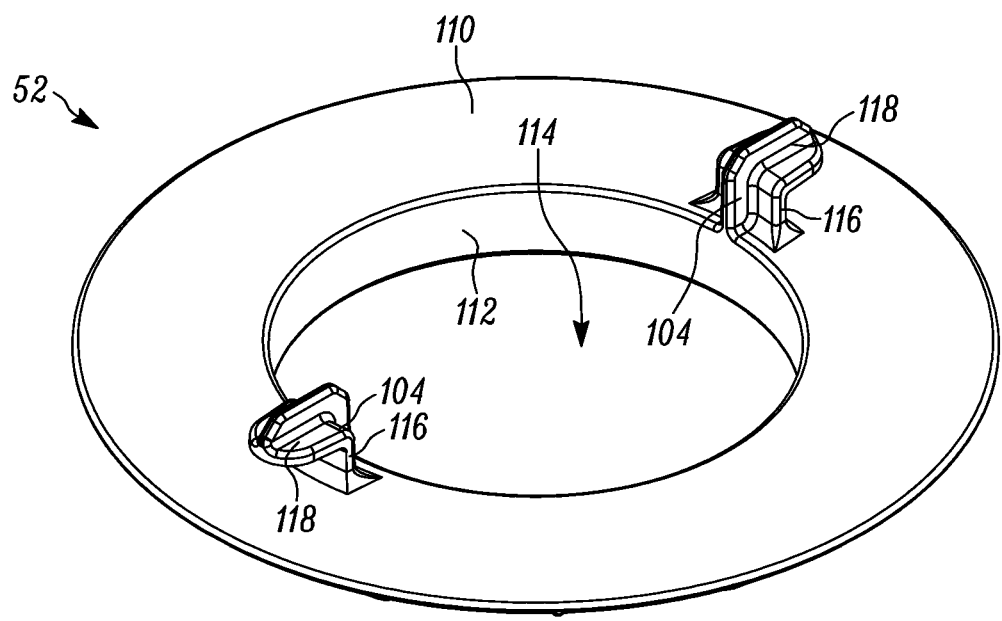
FIG. 10 is an isometric view of the coupling mechanism of the filter assembly of FIG. 5 shown without a coupling gasket.
Figure 11:
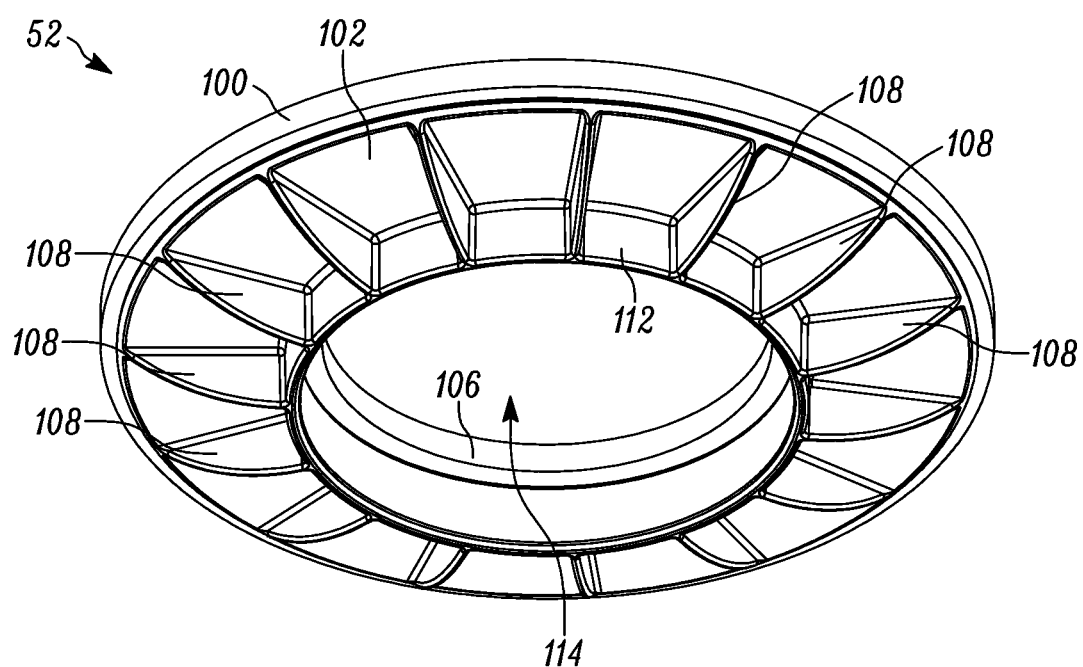
FIG. 11 is an isometric view of the coupling mechanism of the filter assembly of FIG. 5 showing the back side of the coupling mechanism.

Referring now to FIGS. 10 and 11, the coupling mechanism 52, in one example, can include a coupling gasket 100, a carrier member 102 and one or more retention tabs 104. The coupling gasket 100 can be positioned between the housing 50 and the carrier member 102. The coupling gasket 100 can seal the connection between the housing 50 and the carrier member 102. The coupling gasket 100 prevents and/or limits groundwater and/or ground material from passing between the carrier member 102 and the housing 50. In addition, the coupling gasket 100 engages the drain pipe 40 (see FIG. 16) to seal the connection between the drain pipe 40 and the filter assembly 20. As in the example shown, the coupling gasket 100 can be annular in shape and include a drain pipe orifice 106 that is sized to accept the drain pipe 40. To seal the connection, the inner diameter of the drain pipe orifice 106 can be smaller than the outer diameter of the drain pipe 40 such that the coupling gasket 100 can have an interference fit with the drain pipe 40.

The coupling gasket 100 can be made of any suitable foam or other elastomeric material. The coupling gasket 100 can deform and/or stretch to permit the drain pipe 40 to be inserted through the drain pipe orifice 106 during installation of the filter assembly 20. The coupling gasket 100 can be connected to the carrier member 102 of the coupling assembly using adhesive, heat staking, or other suitable attachment.

As further shown in FIG. 10 (showing the coupling mechanism 52 without the coupling gasket 100), the carrier member 102 of the coupling mechanism 52 can include a planar connection surface 110 positioned toward the housing 50. The coupling gasket 100 can be positioned adjacent to the connection surface 110. The carrier member 102 can also include a drain pipe rim 112 that defines a drain pipe channel 114 that extends through the carrier member 102. The drain pipe channel 114 is positioned concentrically with the drain pipe orifice 106. The inner diameter of the drain pipe channel 114 can be larger than the inner diameter of the drain pipe orifice 106 such that the drain pipe 40 engages the coupling gasket 100 when the drain pipe 40 is inserted through the drain pipe channel 114 during installation of the filter assembly 20.

The drain pipe rim 112, in the example shown, is a cylindrical wall that that extends away from the connection surface 110. In other examples the drain pipe rim 112 can have a funnel shape or be tapered in a direction toward the housing 50. Such a configuration of the drain pipe rim 112 can guide the drain pipe 40 toward the coupling gasket 100. The carrier member 102 can also include one or more reinforcement members. In the example shown, the carrier member 102 includes a plurality of ribs 108 that connect the drain pipe rim 112 to the outer portions of the carrier member 102. The ribs 108 stiffen the carrier member 102 and provide further rigidity.

The coupling mechanism 52 also includes, in the example shown in FIG. 11, two retention tabs 104. The retention tabs 104 can be positioned on the connection surface 110 of the carrier member 102. The retention tabs 104 can be positioned radially opposite to one another on opposite sides of the drain pipe rim 112. In other examples, the coupling mechanism 52 can include more than two retention tabs 104 and/or can have retention tabs oriented differently on the carrier member 102.

Each of the retention tabs 104 can include a post 116 and an arm 118. The post 116 can project away from the connection surface 110 of the carrier member 102. The arm 118 can be connected at a distal end of the post 116 to space the arm 118 away from the connection surface 110. The arm 118 can be an elongated member that projects away from the post 116 in a radial direction toward the outer edge of the carrier member 102. Each of the retention tabs 104 is configured to engage the cap 94 of the housing 50 to movably connect the coupling mechanism 52 to the housing 50.

The coupling mechanism 52 can be movably connected to the terminating end 54 of the housing 50. During assembly of the filter assembly 20, one of the retention tabs 104 can be hooked into the drain pipe opening 96 in the housing 50. The second retention tab 104 can be aligned with the scallop 98 in the drain pipe opening 96 (FIG. 9). When aligned, the second retention tab 104 can move into the drain pipe opening 96. The coupling mechanism 52 can then be rotated about its center such that the retention tabs 104 are not aligned with the scallop 98. With this relative positioning, the retention tabs 104 engage the housing 50 to retain the coupling mechanism 52 axially to the housing 50. The coupling mechanism 52, however, is able to slide in an adjustment plane AP (see FIG. 16) relative to the housing 50. With this relative movement between the housing 50 and the coupling mechanism 52, the filter assembly 20 is able to accommodate misalignment between the drain hole 36 and the drain pipe 40 that may occur.

In other examples, the coupling mechanism 52 can include other retention members that can movably connect the coupling mechanism 52 to the housing 50. Such other retention members can include clips, posts, flexible joints, or the like. In the example shown, the carrier member 102 and the retention tabs 104 are integrally formed of a suitable material. For example, the carrier member 102 and the retention tabs 104 can be formed of a plastic or composite material. In other examples, other materials can be used and the coupling mechanism 52 can be made of multiple components subsequently joined together or can be formed of multiple materials formed during a multi-stage forming process.

Figure 12:
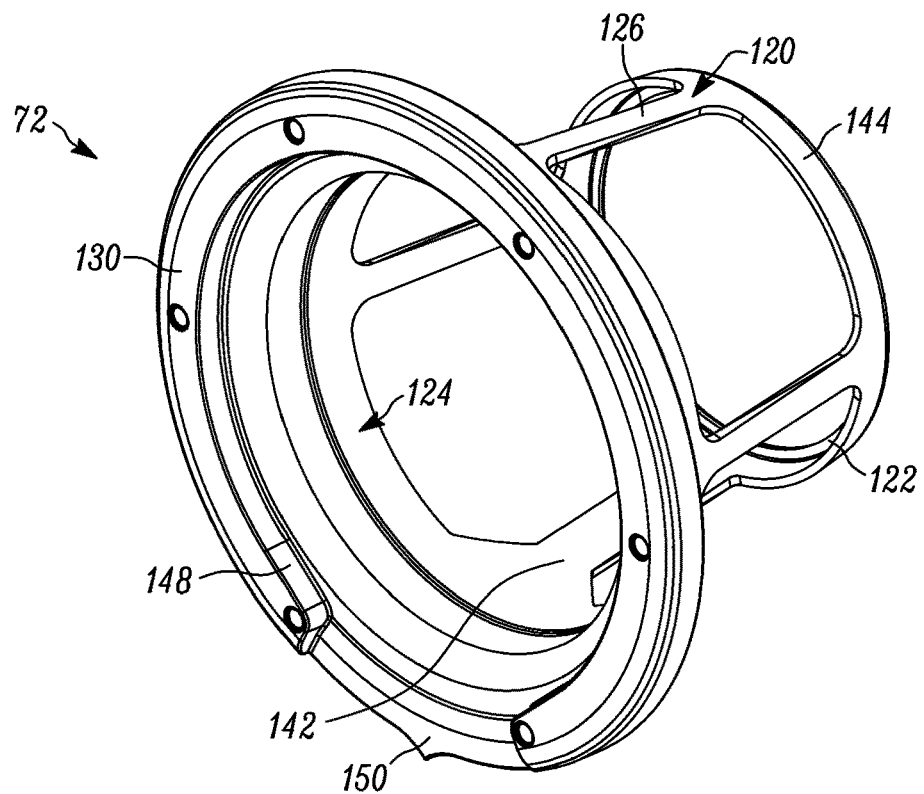
FIG. 12 is an isometric front view of the filter cartridge of the filter assembly of FIG. 5.
Figure 16:
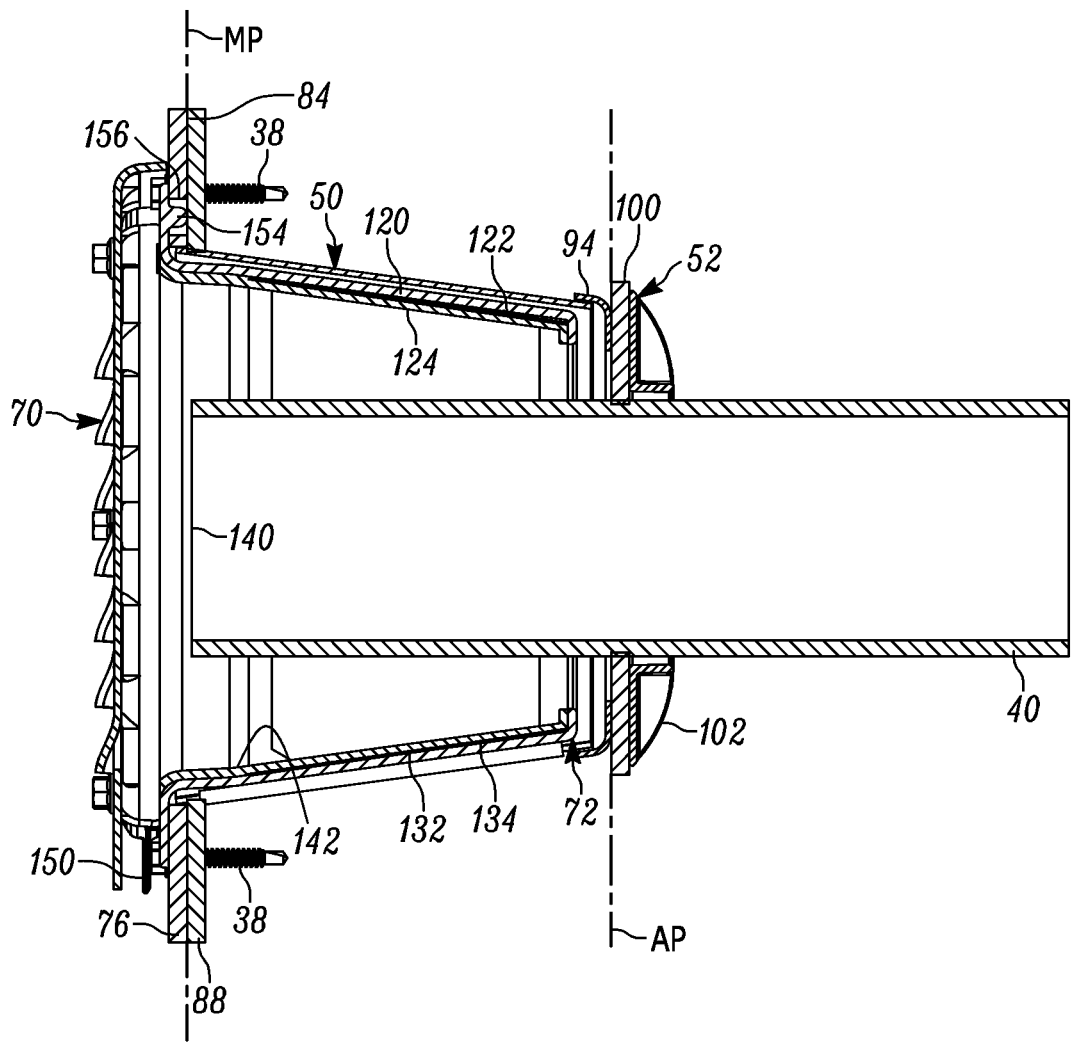
FIG. 16 is a sectional view of the filter assembly of FIG. 5 shown with a drain pipe installed therein.

Referring now to FIGS. 7, 12 and 16, the filter cartridge 72, in the example shown, has a shape similar to that of the housing 50. The filter cartridge 72 can have a frusto-conical shape and is received into the shell 90 of the housing 50. The filter cartridge 72 includes a cage 120, a filter media 122 and a support 124. The filter cartridge 72 can be secured together as a single unit. For example, the cage 120 can be sonically welded to the support 124. In other examples, the cage 120 and the support 124 are separable. The cage 120 is the outermost member of the filter cartridge 72 and the support 124 is the innermost member of the filter cartridge 72. The filter media 122 is located between the cage 120 and the support 124. The cage 120 has a frusto-conical shape and is sized such that it is received inside the shell 90 of the housing 50. The cage 120 is perforated with a series of openings to permit water to flow through the cage 120. The perforations on the cage 120 can be similar to that previously described for the shell 90. In the example shown, the cage 120 has a grid of cage ribs 126 that define the perforations through the cage 120. The cage 120 also includes a first lip 128 that is located at the interface of the filter cartridge 72 to the flange 76. The first lip 128 is an annular structure that is substantially parallel to the flange 76 when the filter cartridge 72 is inserted into the housing 50.

The support 124 can have a structure similar to that of the cage 120 except that the support 124 has an outer profile that is smaller than the cage 120 so that the support 124 can fit inside the cage 120. The support 124 includes a grid of support ribs that define perforations through the support 124. In this manner, the perforations in the support 124 permit water to flow through the support 124. The support 124 also includes a second lip 130. The second lip 130 is positioned parallel to the flange 76 and to the first lip 128. The second lip 130, in this example, has an annular shape and is sized to have an outer diameter that is substantially the same as or larger than the outer diameter of the first lip 128. The second lip 130 is disposed adjacent to the first lip 128.

As further shown in this example, the outer surface 132 of the support 124 is separated from the inner surface 134 of the cage 120 to provide a gap for the filter media 122 (FIG. 16). In this example, the filter media 122 is conical in shape and is made of a durable, waterproof, porous material. As such, the filter media 122 permits water to pass through it but is able to prevent ground material from moving through the filter assembly 20. In one example, the filter media 122 is made of a woven polypropylene material. The filter media 122, in other examples, can have different shapes and configurations and can be made of different materials such as woven, unwoven or other filter material.

The inner surface of the cage 120 can have one or more features that can assist in guiding groundwater out of the filter assembly 20 that is deposited in the filter cartridge 72 by the drain pipe 40. As can be appreciated, the drain pipe 40 may terminate at various axial positions relative to the flange 76 when the filter assembly 20 is installed in the drain hole 36 and on the drain pipe 40. Groundwater that is conveyed into the filter assembly 20 from the drain pipe 40 can exit the drain pipe 40 at the drain end 140 (FIG. 16) of the drain pipe 40. It can be desirable to guide the groundwater that exits the drain end 140 out from the filter assembly 20 rather than permitting the groundwater to flow through one or more of the perforations in the filter cartridge 72 and/or the housing 50. To prevent or minimize the amount of groundwater that moves through the perforations of the filter cartridge 72 (i.e., out of the bottom of the filter cartridge 72), the cage 120 of the filter cartridge 72 can include a guide ramp 142 at a lower portion of the filter cartridge 72. The guide ramp 142 can extend from the second lip 130 axially toward a distal end 144 of the filter cartridge 72. The guide ramp 142 can be a solid or unperforated feature that is angled downward toward the opening of the filter cartridge 72 to cause groundwater that flows out of the drain pipe 40 to move away from the drain pipe 40 and out of the filter assembly 20 rather than flowing out of one or more of the perforations that may be present in either the filter cartridge 72 or the housing 50.

The filter cartridge 72 can also include one or more guide channels 148. The guide channels 148 can be located circumferentially around the inner surface of the filter cartridge 72 and be positioned adjacent to the first lip 128 and/or the second lip 130. The guide channel 148, in the example shown in FIG. 12, is a circumferential channel in the filter cartridge 72 that has a larger inner diameter than the portion of the filter cartridge 72 positioned axially adjacent and toward the distal end 144 of the filter cartridge 72. As such, the filter cartridge 72 has a larger opening at the guide channel 148. This type of feature can assist in guiding groundwater out of the filter assembly 20.

Figure 13:
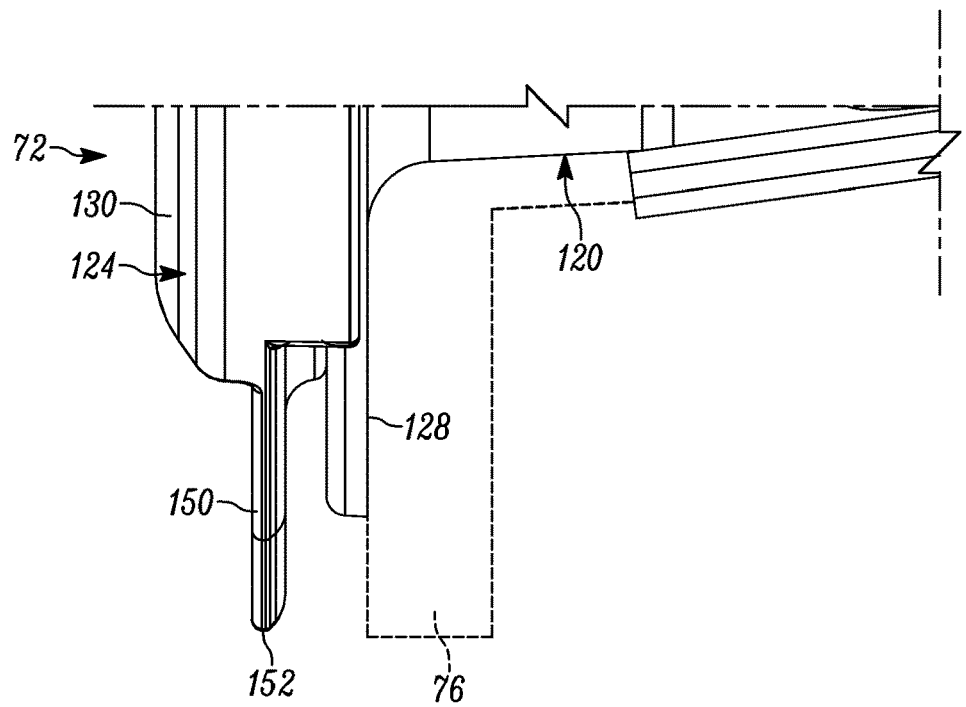
FIG. 13 is a magnified side view of the drip member of the filter cartridge of FIG. 12.

As further shown in FIGS. 12 and 13, the filter cartridge can also include a drip member 150. The drip member 150 can be positioned at a bottom region of the filter cartridge 72. The drip member 150 is a feature of the filter cartridge 72 that serves to alleviate issues related to slow-moving groundwater that flows or drips out of the filter assembly 20. When slow-moving groundwater flows or drips on the retaining wall 22 (FIG. 1), the sediment, minerals or other matter that may be included in the groundwater can stain the retaining wall 22. In addition, if groundwater continuously creates a moisture-rich environment on the retaining wall 22, the moisture can cause algae, mold, moss or the like to grow. Such staining or growth is not aesthetically pleasing and can be cumbersome, costly and time-consuming to remove.

The drip member 150, as shown, can alleviate the above problems by guiding the groundwater away from the retaining wall 22 and by reducing the likelihood that slow-moving groundwater will wick back up the filter assembly 20 and toward the retaining wall 22. The drip member 150, in the example shown in FIGS. 12 and 13, has an upside-down tear drop shape and is positioned at the lowermost portion of the filter cartridge 72. In other examples, other pointed or tapered shapes can be used. As shown, the drip member 150 is positioned such that it is circumferentially aligned with the guide ramp 142 (FIG. 12). In this position, the slow moving groundwater that is guided out of the filter cartridge 72 moves down the guide ramp 142 and toward the drip member 150.

The drip member 150 can be spaced apart from the flange 76 so that when groundwater flows or drips off of the drip member 150, the groundwater does not immediately contact the retaining wall 22. The drip member 150 can also include an angled tip 152. The angled tip 152 is positioned at the end of the drip member 150. The angled tip 152 has an angled surface on the side of the drip member 150 that faces the flange 76. The angled surface of the angled tip 152 is angled away from the flange 76. Small portions or drops of groundwater that may accumulate on the drip member 150 are more likely to drip off the drip member 150 than wick back up the drip member 150 toward the flange 76. With these features, the drip member 150 guides groundwater away from the retaining wall 22 and minimizes the wicking of water toward the retaining wall 22.

Figure 14:
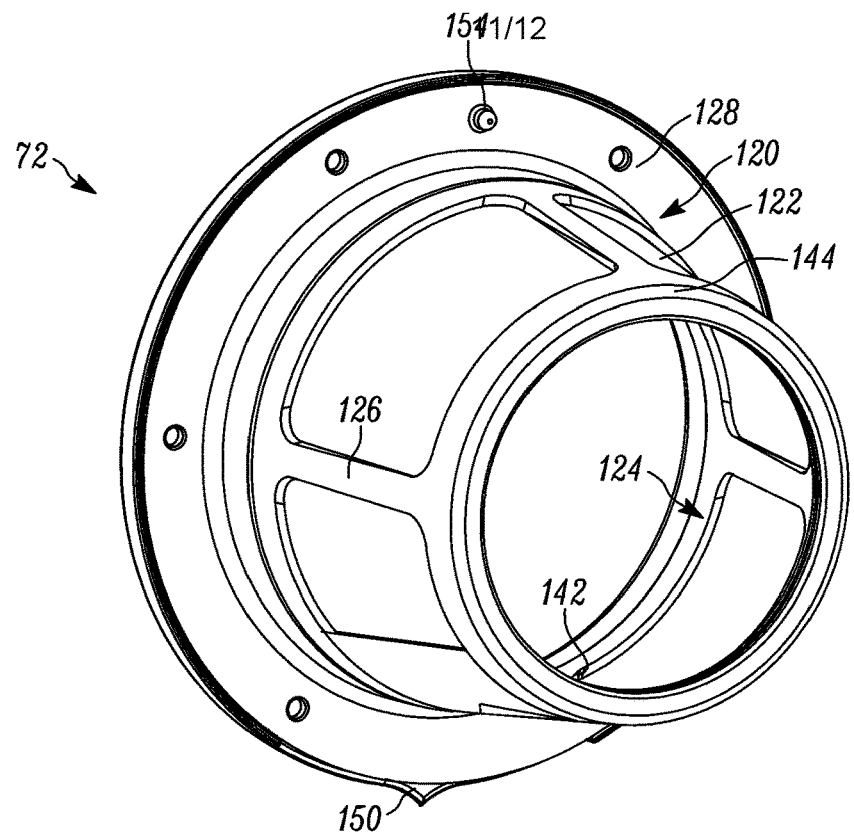
FIG. 14 is an isometric back view of the filter cartridge of the filter assembly of FIG. 5.

As discussed above, the drip member 150 is positioned at the lowermost portion of the filter cartridge 72. As will be discussed below, it may be desirable to remove the filter cartridge 72 after installation of the filter assembly 20 in order to clean or otherwise service the filter assembly. The orientation of the filter cartridge 72 is important, however, given the function of the drip member 150 and the guide ramp 142. In order to assist an operator in assembling the filter cartridge 72 in the proper orientation, the filter cartridge 72 can include an orientation key 154. As shown in FIG. 14, the orientation key 154 can be a projection that extends outward from a surface of the filter cartridge 72 that is positioned adjacent to the housing 50. The orientation key 154 can be received inside an orientation aperture 156 (FIG. 8) in the flange 76 of the housing 50. In this manner, the filter cartridge 72 can be oriented properly with the flange 76 upon initial installation or re-assembly of the filter assembly 20. In the example shown, the orientation key 154 and the orientation aperture 156 have round profiles. In other examples, the orientation key 154 and the orientation aperture 156 can have other shapes or profiles. In still other examples, the orientation key 154 can be positioned in other locations on the filter cartridge 72 or the filter cartridge 72 can have an asymmetrical shape that corresponds with a complimentary feature or shape on the housing 50 such that the filter cartridge 72 and the housing 50 can only fit together in a predetermined relative orientation.

Figure 15:
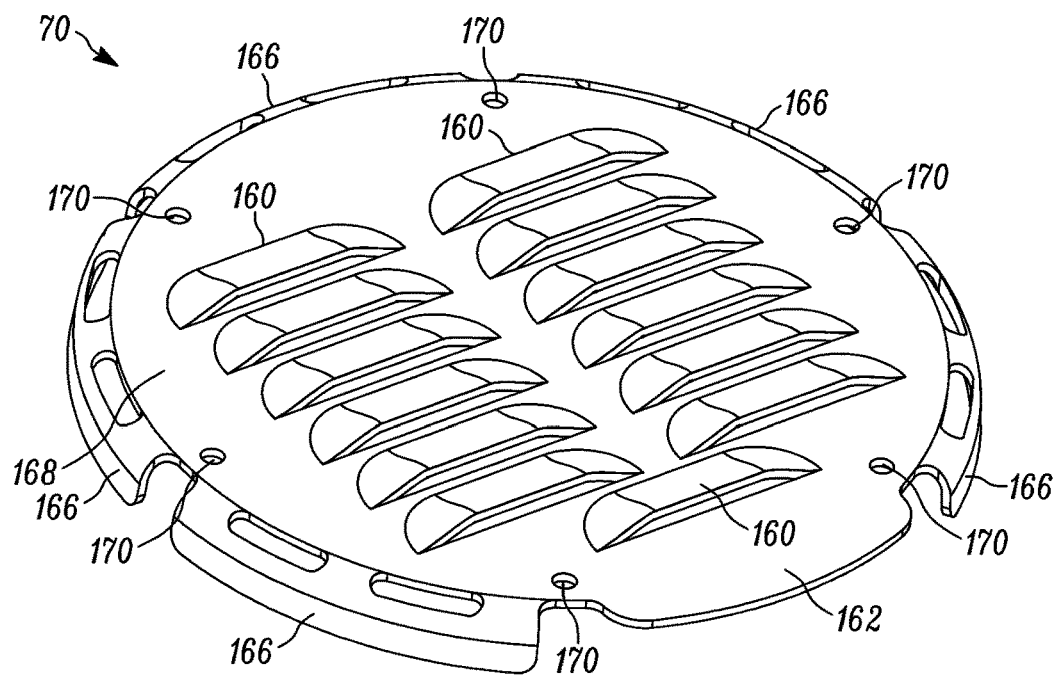
FIG. 15 is an isometric view of the face plate of the filter assembly of FIG. 5.

As shown in FIGS. 7, 15 and 16, the example filter assembly 20 also can include the face plate 70. The face plate 70 can be positioned over the filter cartridge 72 and connected to the flange 76 to retain the filter cartridge 72 in the housing 50. In the example shown, the face plate 70 is a circular member that substantially covers the opening in the filter cartridge 72 and prevents damage to the filter cartridge 72 while still permitting groundwater to exit the filter cartridge 72. To allow groundwater to exit the filter assembly 20, the face plate 70 can include one or more louvers 160. The louvers 160 can have an angled cover that diverts rain, debris or other contaminants away from the filter assembly 20. The louvers 160 also include apertures positioned under the angled covers that permit groundwater to exit the filter assembly 20. In this example, the louvers 160 are elongated and are oriented transversely across the face plate 70. In other examples, other openings, hinged louvers, movable caps or other features can be included that resist external debris from entering the filter assembly 20 while permitting groundwater to exit the filter assembly 20.

As further shown, the face plate 70 can include an extension 162 that is positioned at a lower region of the face plate 70. The extension 162, in this example, is a portion of the face plate 70 that projects downward over the filter cartridge 72 and covers the drip member 150 previously described. At the extension 162, the face plate 70 does not wrap under the filter cartridge 72 and/or the drip member 150. The extension 162 can be spaced away from the drip member 150 to permit groundwater to flow, drip or otherwise move out of the filter cartridge 72. In this manner, the extension 162 can shield the drip member 150 from damage and permit groundwater, including slow-moving groundwater, to exit the filter cartridge 72.

The face plate 70 can include one or more footings 166. The footing 166 are features of the face plate 70 that support the face plate 70 in a position over the filter cartridge 72 by contacting the flange 76. As shown, the footings 166 wrap around an outer circumferential edge of the filter cartridge 72 and extend axially until the footings 166 contact the flange 76. This structure of the footings 166 supports the face plate 70 in a position in which the face surface 168 of the face plate 70 is spaced apart from the exposed side 86 of the flange 76. As can be appreciated, the footings 166 can protect the filter cartridge 72 from damage by covering the filter cartridge 72, including the outer edge of the filter cartridge 72, as well as transferring forces that may be exerted on the face plate 70 to the flange 76 of the housing 50. By transferring such forces to the flange 76, the filter cartridge 72 can be shielded from damage since such external forces are not transferred from the face plate 70 to the filter cartridge 72.

In the example shown, the face plate 70 includes five footings 166 distributed circumferentially around the outer edge of the face plate 70. In other examples, the face plate 70 can include more than five footings 166 or less than five footings 166. In still other examples, the footings 166 can have different shapes than as previously described and shown. For example, the footings 166 can be shaped as tabs that are bent or formed in the face plate 70 or can be bushings used in connection with one or more fasteners used to attach the face plate 70 to the filter assembly 20.

The face plate 70 can be connected to the filter assembly 20 using any suitable attachment. In the example shown, the face plate 70 includes six attachment holes 170 through which a suitable fastener is used to secure the face plate 70 through the filter cartridge 72 and into the flange 76. In other examples, other suitable attachments can be used including more or less than six attachment holes 170. In still other examples, the face plate 70 can be removably connected to the filter assembly 20 using clips, tabs, hinges or the like.

As previously discussed, the filter assembly 20 can accommodate circumstances in which the drain pipe 40 is misaligned from the drain hole 36. As shown in FIG. 16, the coupling mechanism 52 can move relative to the housing 50 in the adjustment plane AP. The adjustment plane AP is a plane substantially parallel to the wall-facing side 84 of the flange 76. The coupling mechanism 52 can translate in the adjustment plane to vary the positioning of the drain pipe channel 114 and the drain pipe orifice 106 relative to the housing 50. In this manner, the coupling mechanism 52 can permit the filter assembly 20 to self-align with the drain pipe 40 during installation of the filter assembly 20 in the drain hole 36.

The housing 50 can also move in a mounting plane MP to provide further adjustability. The mounting plane MP is aligned with the wall-facing side 84 of the flange 76 and generally corresponds to the exterior side (the second side 34) of the retaining wall 22. Since the diameter of the base 64 of the housing 50 can be undersized relative to the diameter of the drain hole 36, the housing 50 can be moved inside the drain hole 36 to permit installation when the drain hole 36 and the drain pipe 40 are misaligned.

In one example, the filter assembly 20 can accommodate a circumstance in which the center axis of the drain pipe 40 is offset from the center axis of the drain hole by one inch or less. In another example, the filter assembly 20 can accommodate a circumstance in which the center axis of the drain pipe 40 is offset from the center axis of the drain hole 36 by 2 inches or less. In still another example, the filter assembly 20 can accommodate a circumstance in which the center axis of the drain pipe 40 is offset from the center axis of the drain hole by one half the outer diameter of the drain pipe 40.

The filter assembly 20 can also accommodate a circumstance in which the center axis of the drain pipe 40 is angled with respect to the center axis of the drain hole 36 (or is at a non-orthogonal orientation with respect to the external surface of the retaining wall 22). Such an angled orientation can occur, for example, when the drain pipe 40 is angled downward to cause ground water to drain from the drain pipe 40. In one example, the filter assembly 20 can accommodate circumstances in which the center axis of the drain pipe 40 is oriented at an angle of up to and including 20 degrees. In another example, the filter assembly 20 can accommodate circumstances in which the center axis of the drain pipe 40 is oriented at an angle of up to and including 25 degrees.

The filter assembly 20 of the present disclosure can be easily installed and serviced to provide durable, cost-effective relief of hydrostatic pressure from land areas behind retaining walls 22. The filter assembly 20 can be installed by inserting the housing 50 into the drain hole 36 in the retaining wall 22. As the flange 76 moves closer to the retaining wall 22, the coupling mechanism 52 can contact the drain pipe 40. As this occurs, the operator can translate the housing 50 upwards, downwards and side-to-side in the drain hole 36 such that the drain pipe 40 is received inside the drain pipe rim 112 of the coupling mechanism. As the drain pipe 40 is received through the coupling mechanism 52 and the flange 76 is moved toward the retaining wall 22, the coupling mechanism can translate in the adjustment plane AP relative to housing 50 such that the coupling gasket 100 deforms to seal the joint between the drain pipe 40 and the coupling mechanism 52.

Once the housing 50 is seated against the retaining wall 22, the housing 50 can be secured to the retaining wall 22 using one or more fasteners. The filter cartridge 72 can then be inserted into the housing 50 and the face plate 70 can be secured over the filter cartridge 72. Once the face plate 70 is secured, the installation is complete and the filter assembly 20 can receive groundwater as previously described either through the perforated housing 50 or from the drain pipe 40.

During use, the drainage of groundwater through the housing 50 can cause the filter assembly 20 to become clogged with soil or other ground material 28. When this occurs or upon a previously determined maintenance schedule, the face plate 70 can be removed to access the filter cartridge 72. The filter cartridge 72 can then be easily removed, cleaned and replaced into the housing 50. Such maintenance and/or cleaning is simple and cost-effective.

In other example filter assemblies, the coupling mechanism 52 can be fixed relative to the housing 50. In such examples, the coupling gasket 100 and/or the carrier member 102 can be attached to the housing 50 using any suitable attachment such as adhesive, fasteners or the like. Such filter assemblies can be used, for example, in circumstances in which the drain pipe 40 is generally aligned and/or centered in the drain hole 36.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A filter assembly for relieving hydrostatic pressure, the filter assembly comprising:
    a housing comprising a flange and a shell, the flange including an opening extending through the flange, the shell including a base and a terminating end, the base of the shell connected to the flange at the opening and extending away from the flange toward the terminating end of the shell;
    a coupling mechanism disposed at least partially in the shell and including a drain pipe orifice to accept a drain pipe therein, the coupling mechanism including a first retention tab and a second retention tab that are connected to the terminating end of the shell to prevent the coupling mechanism from moving in an axial direction relative to the housing and allow the coupling mechanism to move in a radial direction relative to the housing to change a position of the drain pipe orifice relative to the terminating end of the shell;
    a filter cartridge removably positioned inside the shell; and
    a face plate removably connected to the flange to secure the filter cartridge inside the shell.

2. The filter assembly of claim 1, wherein the drain pipe orifice of the coupling mechanism is movable in an adjustment plane to change the position of the drain pipe orifice relative to the terminating end of the shell, the adjustment plane disposed substantially parallel to the flange.

3. The filter assembly of claim 2, wherein the coupling mechanism comprises a gasket and a cap member, the gasket positioned between the terminating end of the shell and the cap member to fluidly seal the coupling mechanism and the shell.

4. The filter assembly of claim 3, wherein the first retention tab and the second retention tab extend from a flat surface of the cap member, the first retention tab and the second retention tab projecting away from the cap member and engaging the shell to retain the coupling mechanism to the shell.

5. The filter assembly of claim 4, wherein the first retention tab and the second retention tab are positioned opposite to one another on a side of the cap member facing the shell.

6. The filter assembly of claim 5, wherein the shell includes at least one perforated region through which groundwater can pass into the filter assembly.

7. The filter assembly of claim 1, wherein the coupling mechanism can move from a first position in which the coupling mechanism is axially aligned with the shell to a second position in which the coupling mechanism is axially offset from the shell, the coupling mechanism remaining engaged to the shell in the first and second positions.

8. The filter assembly of claim 1, wherein the coupling mechanism is configured to move relative to the shell to self-align with the drain pipe when the filter assembly is installed in a retaining wall and on the drain pipe.

9. The filter assembly of claim 8, wherein the filter cartridge includes a drip member spaced apart from the flange, a back surface of the drip member angled away from the flange to prevent groundwater from wicking toward the flange.

10. The filter assembly of claim 9, wherein the drip member has an upside-down teardrop shape.

11. The filter assembly of claim 10, wherein the filter cartridge includes a guide ramp, the guide ramp including an angled surface for guiding groundwater that exits the drain pipe toward the drip member.

12. A filter assembly for allowing groundwater to flow from a first side of a retaining wall to a second side of the retaining wall, the filter assembly comprising:
  a housing comprising a flange and a shell, the flange including an opening extending through the flange, the shell including a base and a terminating end, the base of the shell connected to the flange at the opening and extending away from the flange toward the terminating end of the shell;
  a coupling mechanism disposed at least partially within the shell and including a coupling gasket with a drain pipe orifice to accept a drain pipe therein, the coupling mechanism including a first retention tab and a second retention tab that are connected to the terminating end of the shell to prevent the coupling mechanism from moving in an axial direction relative to the housing and allows the coupling mechanism to move in a radial direction relative to the housing;
  a filter cartridge removably positioned inside the shell, the filter cartridge including a drip member projecting downward and angled away from the flange to prevent groundwater from wicking toward the flange; and
  a face plate removably connected to the flange to secure the filter cartridge inside the shell.

13. The filter assembly of claim 12, wherein the drip member is in fluid communication with at least one channel positioned circumferentially around an inner surface of the filter cartridge, the at least one channel configured to guide groundwater from the inner surface out of the filter cartridge at the drip member.

14. The filter assembly of claim 13, wherein the coupling mechanism can move from a first position in which the coupling mechanism is axially aligned with the shell to a second position in which the coupling mechanism is axially offset from the shell, the coupling mechanism remaining engaged to the shell in the first and second positions.

15. The filter assembly of claim 14, wherein the drip member is spaced apart from the flange when the filter cartridge is seated in the housing to limit ground water from dripping on the retaining wall.

16. The filter assembly of claim 15, wherein at least a portion of the face plate wraps around an outer edge of the filter cartridge and contacts the housing.

17. The filter assembly of claim 16, wherein the face plate includes a plurality of louvers to allow groundwater to exit the filter cartridge.

18. The filter assembly of claim 17, wherein the face plate includes an extension that extends across the drip member and is spaced apart therefrom to allow water to exit the filter cartridge between the drip member and the face plate.

19. The filter assembly of claim 18, wherein the face plate is removably connected to the flange with a plurality of fasteners to permit the face plate and filter cartridge to be removed for cleaning after installation.

20. A filter assembly for connection to a retaining wall and a drain pipe to relieve hydrostatic pressure, the filter assembly comprising:
  a housing comprising a flange and a perforated shell, the flange including an opening extending through the flange, the shell including a base and a terminating end, the base of the shell connected to the flange at the opening and extending away from the flange toward the terminating end of the shell, the opening and the shell axially aligned along a first axis;
  a coupling mechanism including a drain pipe orifice to accept the drain pipe therein, the coupling mechanism movably connected to the terminating end of the shell such that the coupling mechanism can move from an aligned position in which a center of the drain pipe orifice is located on the first axis to an offset position in which the center of the drain pipe orifice is offset from the first axis;
  a filter cartridge removably positioned inside the shell, the filter cartridge including a drip member and an orientation key, the drip member projecting radially outward from the first axis and away from the flange to prevent groundwater from wicking toward the flange, the orientation key projecting toward the flange and received in an orientation aperture in the flange to orient the filter cartridge relative to the housing in a desired position; and
  a face plate removably connected to the flange to secure the filter cartridge inside the shell, the face plate including one or more footings positioned adjacent to filter cartridge and contacting the housing to support the face plate over the filter cartridge.

* * * * *